July 8, 1924.

H. PLAUSON 1,500,845

PROCESS AND APPARATUS FOR THE MANUFACTURE OF DISPERSOIDS

Filed April 22, 1921    4 Sheets-Sheet 1

Inventor.
Hermann Plauson
by Knight Bro.
attorneys

Patented July 8, 1924.

1,500,845

UNITED STATES PATENT OFFICE.

HERMANN PLAUSON, OF HAMBURG, GERMANY.

PROCESS AND APPARATUS FOR THE MANUFACTURE OF DISPERSOIDS.

Application filed April 22, 1921. Serial No. 463,618.

*To all whom it may concern:*

Be it known that I, HERMANN PLAUSON, Esthonian subject, residing at Hamburg, Germany, have invented certain new and useful Processes and Apparatus for the Manufacture of Dispersoids, of which the following is a specification.

This invention relates to an improved process and apparatus for the manufacture of colloidal or dispersoidal suspensions of various substances to various degrees of fineness.

According to the processes hitherto employed, certain solid substances, after being subdivided can be converted into a more or less dispersed condition by:—

1. Dissolving in a dispersing medium (reversible colloids).
2. By electrical disintegration in a dispersion medium which is a non-conductor of electricity (irreversible colloids).
3. By the use of chemical means.

These three processes of treatment may also be divided into two main classes firstly, the condensation methods employing chemical means, and dispersion methods in which the particles are scattered (Zerstaubung).

As is well known the dispersion method is based on the discovery of Bredig, that if an electric arc be formed between two electric points or wires under water the metal of the electrodes is scattered or disintegrated in a finely dispersed or colloidal form.

Even by using 110 volts pressure and with a suitable resistance, a fine dispersion of a blue or violet colour at 4 to 5 amperes may be obtained by forming an electric arc between metal electrodes to be disintegrated. This may also be obtained if a higher voltage spark be caused to jump in a dispersion medium between two points of the metal to be dispersed.

The dispersion method by means of an electric arc can only be carried out with substances which are conductors of electric current, such as metals, and this method cannot be used for the dispersion of non-conducting substances or even chemical compounds such as oxides, basic salts, dyes of all kinds and the like. Yet it is of very great technical value to be able to disperse these substances as finely as possible and without chemical means; thus in the case of dyes or paints the covering power, colour effect and other properties may be much improved. By the use of the process of the present invention cheap common kinds of colours may be improved in properties in a very simple way.

My invention relates to a general process for the dispersion of substances, and to an apparatus especially suitable therefor.

The new process is based on the fact observed by me that when various substances (e. g. ores, dyes, sulphur, cellulose etc.,) in a previously ground condition are continuously pounded or rubbed with a quantity of a suitable liquid dispersion medium, which is a non-conductor of electricity or only slightly conducting, with sufficient force and for sufficient length of time in an impact mill or disc pin, or the like mill (e. g. a dismembrator or Kreuz mill) it is possible to convert many such substances into a more or less finely dispersed or colloidal condition. By the addition of small quantities of protective colloids during the grinding, the dispersion effect can not only be considerably increased but the substances can also be kept for a long time and used with their dispersion media as colloids solutions. The process may be carried out with the above mentioned mills of the liquid escaping therefrom, be constantly returned thereto by means of a pump.

In the application of the process of the present invention to mills of usual type it has been found that often considerable practical difficulties are present. With some substances, such for example as cellulose, the fine sieves of the usual form of grinding mill would become clogged or stopped and the machines consequently immediately lose its effect.

Apparatus consisting of a beating mill, a pump and the necessary intermediary pipes are therefore in most cases ill adapted for making homogeneous dispersoids by the process of the invention above indicated, it being only possible to convert them unevenly and with considerable loss of efficiency and ultimately the fine dispersed parts have to be separated from the coarser. It is however to be understood that in case of need, a result can be obtained even with such apparatus of usual type.

The full benefits of the invention are obtainable with a novel type of rapid running beating or friction mill that is to say in a mill in which the peripheral grinding speed is at least 1000 metres per minute whilst it has been found that for the purpose of the manufacture of colloidal suspensions, the efficiency rapidly increases with increases in peripheral grinding speed above this value. The most important advantage of these machines is that with them almost mono-dispersed or so called isosegmatic systems can be obtained and coarse substances of the most varied kinds can be converted into a dispersed condition.

Such mills may comprise a chamber having one or two rapidly rotating beaters provided with beater arms of any suitable type which beaters are eccentrically mounted in the chamber so that grinding takes place between these rotating beaters and stationary abutment teeth or beating surfaces which are preferably adapted to be adjusted from the outside by means of a hand wheel for adjusting to a more or less fine grinding. This has the advantages, firstly that the entire beating power is mainly concentrated at the place of the beating resistance, and secondly that the rotating beaters provided with the beating arms effect a thorough mixing of the material with the dispersion medium and always return the material again to the beating place, and thirdly, that by the regulation of the free space between the beater abutment and rotating beaters a preliminary grinding and conversion into the dispersed condition is rendered possible even in the case of fibrous substances. In similar manner to the dispersion machines with beater arms, machines may also be made which produce the same action by friction.

In the accompanying drawings.

Figures 1, 2:
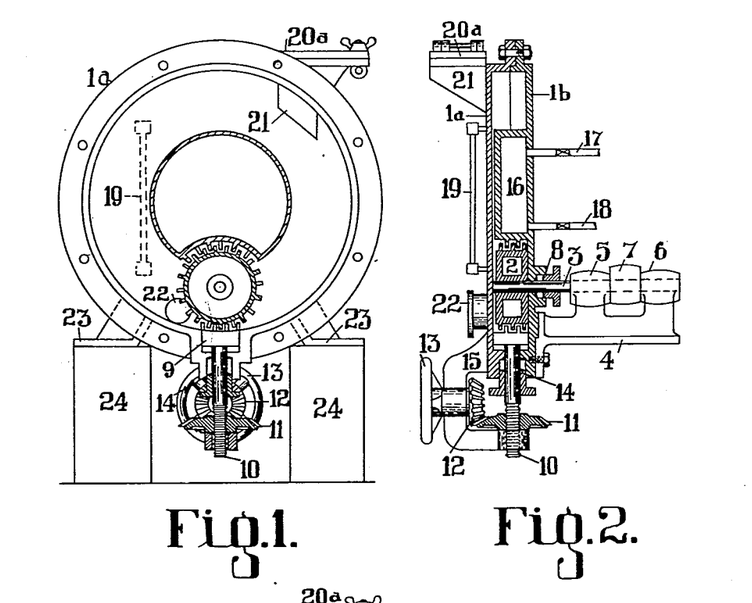
Figs. 1–10 show percussion machines Fig. 11 a grinding machine and Figs. 12–13 are valves.

In Figs. 1 and 2, I represents the machine casing which is made in two parts 1ª and 1ᵇ, 2 is the rotating part of the beater mill, 3 its shaft, 4 brackets for bearings, 5, 6 bearings for the shaft 3, 7 belt pulley, 8 stuffing box for the shaft packing, and 9 the regulable stationary beater abutment. This has also beater arms or pins which pass exactly into the intervals of the rotating arms. The regulation is effected by means of a spindle 10 provided on the fixed abutment 9, on the lower end of which spindle a thread is provided which can be turned to right or left by means of a lateral horizontally placed bevelled spur wheel 11 a vertical spur wheel 12 and a hand wheel 13 which latter is supported by a bracket 13 whereby the beater abutment 9 can be raised or lowered a stuffing box 14 is provided for a spindle 1ª. 16 is a fixed internal hollow cylinder, the object of which is in the first place to distribute the liquid in the mill so that a free cylindrical ring or annular space is formed for the liquids to be beaten. By the acton of centrifugal force due to the rotation of the beater 2 the liquid receives a circular direction of travel about the cylindrical centre piece 16 and is constantly being returned to the beating place. In Fig. 1 the lower part of the hollow stationary cylinder which is located in the centre is shaped and provided with beaters to co-act with the rotating part of the plunger 2. By this means not only is a double beater action obtained, but also a more energetic effect of rotation of the dispersion medium with the substances to be dispersed.

The hollow centre piece is steam tight and may be connected by pipes 17 and 18 through valves with a steam pipe or with cooling water, whereby a uniform heating or cooling during the beating may be obtained.

In order to enable the level of the liquid to be observed, a liquid gauge glass 19 is provided and this arrangement also permits of the taking of samples for tests.

The material to be dispersed may be slowly introduced through the feed device 20, 21, which may be made fluid tight through the cover 20ª, and the finished mixture is discharged through the outlet mechanism 22, provided with a wedge valve.

The entire machine may be mounted on a base 23, 24, so high that the valve control is clear of the ground. The machine is filled up to from ½ to ¾ of its height and then the beating is commenced; the liquid is thereby set in strong circulatory movement and repeatedly subjected to the beating action until the desired degree of dispersion is obtaned.

Figure 3:
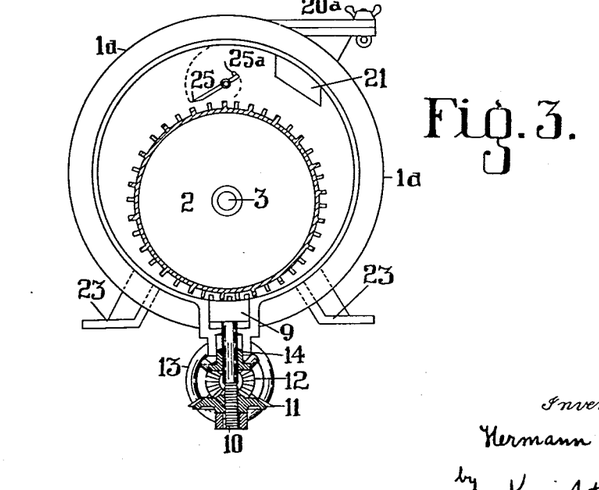

In Fig. 3 instead of the central fixed cylinder 16, a knife 25 is used which is adapted to be moved about an axis and which is prevented by means of two pins 25ª from encountering the beaters.

Figures 4, 5:
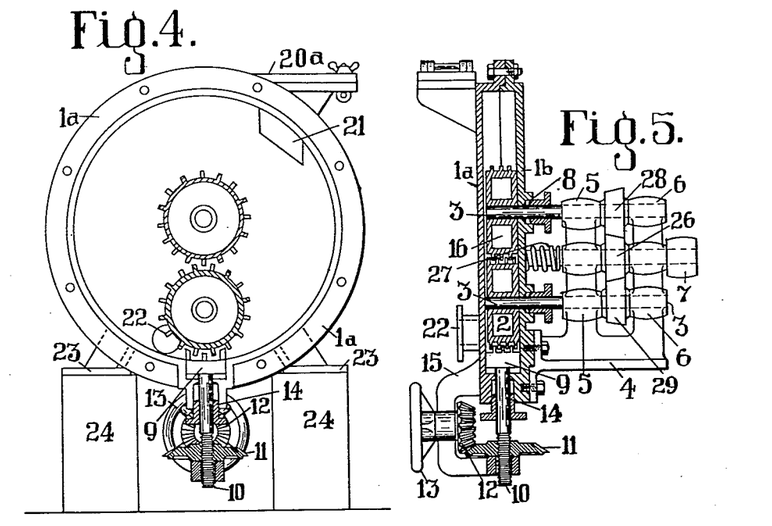

In the modified construction of Figures 4 and 5, the uniform rotation of both beaters is obtained by means of a conical friction disc 26 under control of spring 27 which disc engages two reversely conical driven discs 28 and 29 (Fig. 5). Now when the central cone is set in rapid rotation from the driven belt pulley 7 the two other conical discs 28 and 29 are also set in rotation by frictional contact. In the case of a temporary over-load the spring 27 can yield whereby an automatic compensation is possible.

Figure 6:
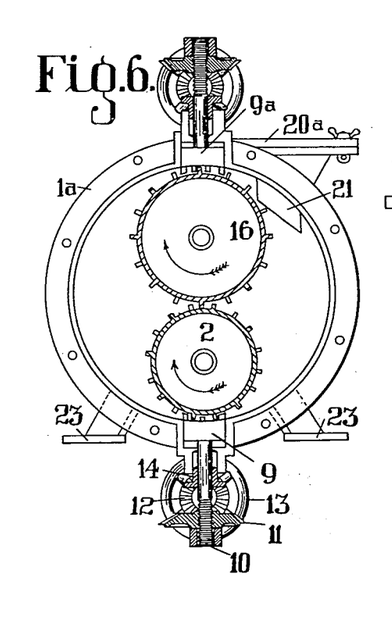

Fig. 6 shows the same machine, modified in that the two rotating parts are of different sizes and divide the entire casing into two parts whereby three beating places are formed. Further fixed adjustable beating resistance are shown at two places.

Figure 7:
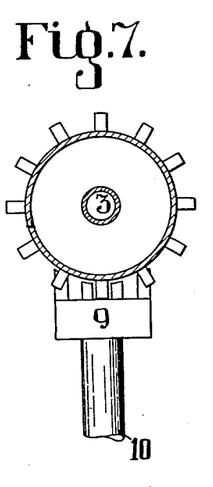
Figure 8:
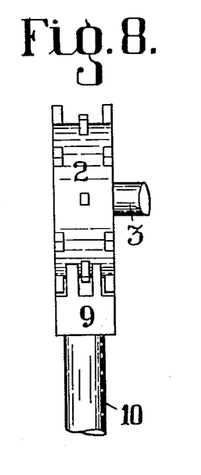

The beater or grinding area is shown in detail in Figures 7 and 8. The separate bars of the adjustable but non rotating beating abutments 9 are so arranged that they come exactly between the rows of the rotating parts leaving larger or smaller intermediate spaces according to the predetermined adjustment. Preliminary and fine grinding up to a sufficient degree of dispersion may thereby be effected in one and the same machine. The regulating device must however, be so constructed that even with the finest adjustment possible there is no possibility that the beater arms meet one another.

Figure 9:
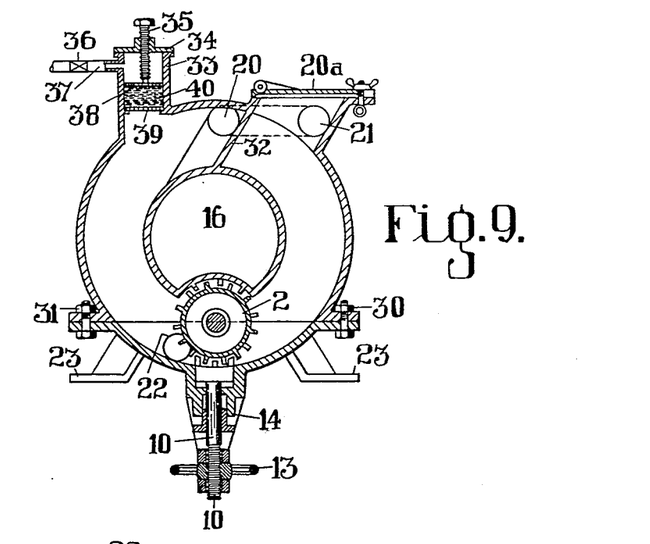
Figure 10:
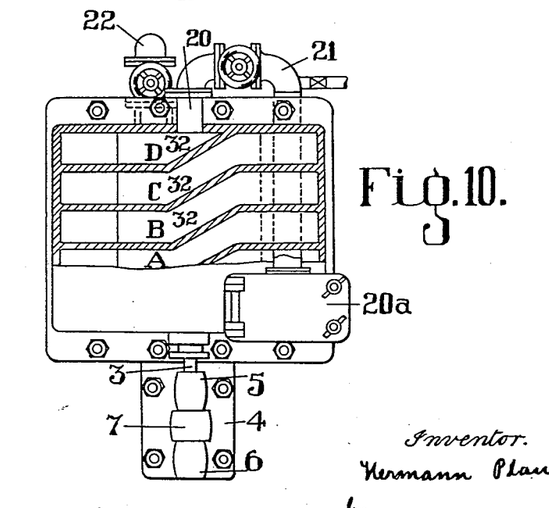
Figure 11:
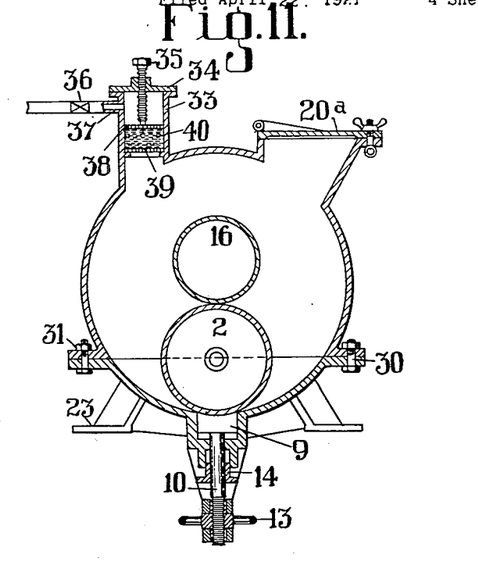

Figs. 1–6 illustrate types of non-continuously working machines, for substances which are very easily dispersed machines may be constructed which are based on the same principle but which can be employed separately or in series. Such a dispersion machine is shown in Figs. 9 and 10. The dispersion medium with the substances to to be dispersed drops through an opening 21 into the mill at the beating place 9 and are then subjected to the beating action and then thrown by centrifugal force through an opening 20 into the next compartment B and from B again into C and so forth until they finally come into the collecting vessel through an opening 22 in the compartment D, or through a connecting pipe 20/21 are returned to the compartment A. (In order that the internal construction may be better understood a portion of the mounting in Fig. 10 is omitted.) To prevent the liquid falling back to the other side of the separate compartments, an inclined partition 32 or the like is provided at the upper opening 20. The machine has as many rotating dismembering discs as there are compartments. To mount these on a shaft and to make the machine compact the machine is cast in two parts held together by means of bolts 30 and 31.

A considerable acceleration of the process is obtained by working under vacuum, and further under vacuum it is possible to treat dry material. Hitherto the difficulty of vacuum grinding was that the finest particles were carried away with the air or gas formed.

Figure 12:
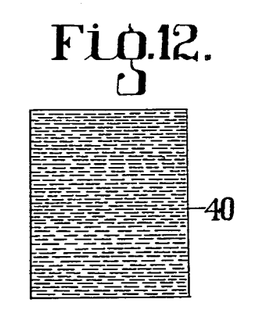
Figure 13:
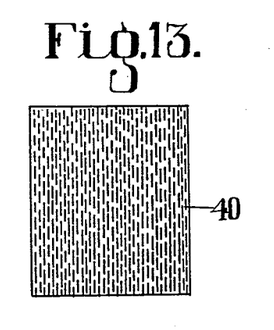

This difficulty is avoided by the provision of a filter as shown in Figs. 9, 11, 12, and 13. In a projection 33 of the casing of the machine there is a perforated plate 39 on projecting bars, and over this plate a plurality of thin filter plates 40 provided with elongated narrow slots, as shown in Figs. 12 and 13 which are arranged alternately with the slots in a longitudinal and transverse direction, and over them again a perforated plate 38. The whole is pressed firmly together by means of a pressure screw 35 located in the cover 34. The filter thus formed, which may if desired be coated with suitable elements (cement and the like), is absolutely tight to the finest dust and even to colloids. The vacuum pump is connected to the pipe 37 which is adapted to be closed by means of a valve 36.

Air and any gas formed in the interior of the machine is drawn off in this way without a trace of the dispersion material passing through.

Instead of dispersion machines with a beater action, such machines may be constructed with a frictional action. The construction of such machines may be similar to that of the beater arm. Such a machine is illustrated diagrammatically in Fig. 11. As may be seen from the drawings the machine hardly differs from the others except by the omission of the beater arms on the dismembering disc and on the regulatable frictional abutment. The abutment is here controlled directly (Fig. 11) but may however also be made in the manner shown in Figs. 1–6. The rotating friction disc may also be larger or smaller than the stationary one, other conditions remaining the same.

By employing one of the dispersion machines hereinbefore mentioned the most varied substances may be converted into the very finest dispersed condition if only suitable dispersion media, temperatures, and proportionate quantities are employed. In order to be converted into a sufficiently finely dispersed condition many substances require varying lengths of time of treatment.

Small additions of media which serve for assisting the dispersion or act as protective colloids for dispersions greatly facilitates and accelerate the process.

The process will be better explained by the following examples.

*Example 1.*

90 parts of distilled water and 10 parts of flowers of sulphur are beaten for from 3 to 5 hours in a dispersion machine of the type shown in Fig. 1, at ordinary room temperature. During this time the entire sulphur is converted into a finely dispersed condition and behaves like colloidal sulphur solution made by chemical means. If the solution be allowed to stand for from 1 to 2 hours after beating, small quantities of the sulphur suspension are precipitated, whilst the major part of the remainder remains a long time in a colloidal condition. If during the beating 1 to 3% of protective colloids such as protein, gelatine, glycerine, neutral soaps and like substances be added thereto a sulphur dispersion in water of great fineness is obtained. By the addition during the beating of small quantities of substances which dissolve sulphur for instance benzole, benzene, carbon-bi-sulphide, or the like, the beating time may be shortened by half and 30 to 40% of the sulphur even converted during this time into the condition of amicrone (particles of exceptional fineness).

Molten sulphur may also in a similar manner be converted into a dispersed or colloidal condition. By heating the dispersion medium to 80–90° C. the dispersion process is further accelerated, but then the beating must be continued with simultaneous cooling until the temperature of the liquid has descended to 25–30° C., otherwise the sulphur is precipitated or becomes flocculent.

The process may however also be regarded as a refining process if the sulphur after being converted into a dispersed condition is precipitated by the addition of small quantities of acid, washed and then afresh converted into a dispersed condition in pure water in accordance with this invention.

As by this invention sulphur can be converted into a very finely dispersed condition without the use of chemical means, which was not possible hitherto by other generally known methods, a sulphur solution is obtained of extraordinary value for various purposes. The dispersion medium may also be more or less removed by careful evaporation in vacuo and thereby concentrated solutions may also be formed. Instead of water an organic dispersion medium may also be employed.

If less sulphur in proportion to the water be employed the degree of dispersion is still finer. It is not advisable to proceed beyond the ratio of 1 to 9 as then the dispersion is slower and not so complete without the use of accelerating catalysts and the addition of protective colloids. Such colloidal solutions are applicable for the disinfection of trees, vines and the like, also for surgical and the like purposes.

Example 2.

15 parts of crude graphite previously washed with boiling water and 100 parts of water are triturated at a temperature of from 80–90° C. for 5–10 hours (preferably by the use of the machine of Fig. 11) and this is continued under strong cooling until the temperature of the liquid has sunk to 25° C. The mixture obtained is then pumped into a hollow cylinder and allowed to stand for ½ to 2 hours. After this time the dispersion medium with the floating graphite particles is carefully separated, by decanting, from the bottom layer, freed by treatment in a centrifugal from excess water and dried. About 60–85% of colloidal graphite is thereby obtained which forms an excellent lubricant for machinery.

The sand and other particles of impurity are deposited on the bottom and can be utilized for making crucibles and the like coarse articles. By the addition of 1–3% potash-olein soap, also tannin and phenol sulphonic acids such as naphtho-disulphonic acids the process may be accelerated whilst by a preliminary treatment with alkali, washing and a fresh dispersion the yield may be increased to about 76–78%. Other dispersion media may be taken in place of water for example, graphite previously freed from ashy constituents by chemical means may be converted into a finely dispersed condition in oils or in petroleum and the like. In similar manner an extremely fine dispersion of talc of the best imaginable quality has been obtained and also lamp black of high quality may be obtained from cheap qualities of soot even from wood and the like.

Example 3.

10 parts of olein soap and 1 part of coarse grained ultramarine (as a product of wet grinding), are, after previous washings with hot water (in order to remove traces of sodium compounds) beaten or ground with 100 parts of cold water for 1–3 hours. During this time the material becomes very finely dispersed and remains floating in the water. It is now allowed to stand and the dispersed material separated by decantation from any course material. Excess water may be removed in a centrifugal, and on careful drying 86–95% fine colloidal colouring material of extremely high covering power can be obtained without the time consuming and expensive sludging such as has hitherto been done in the previously known processes, being necessary.

Instead of water, organic dispersion media, such as benzol, alcohol, alone or with the addition of small quantities of oil and (or) alternatively turpentine may be employed, if a particularly good kind of turpentine or oil colour is desired.

In similar manner low value kinds of earth and metallic colours (such as iron, cobalt, nickel, zinc, chrome colours) or lithopone, as well as other substances employed for dye purposes may be converted into a finely dispersed condition. Instead of soap small quantities of alkali or oils or phenol-sulphonic acids e. g. naphthol-di-sulphonic acid may be added as accelerators. In some cases tannin or other deflocculating agents may be used. In colours which are to be mixed with oil, in special cases instead of water an organic dispersion medium may be used with or without small quantities of oil or lacquer solvent. The result of this is that the colours obtained in this way mix well with the oil added in large quantities before use and have extremely good separating and spreading power.

The colloid mill affords still greater advantages if at the moment of forming colouring substances or dyestuffs, the initial substances are not treated by the ordinary method but in the colloid mill, in such a way lithopone, lead colours and the like can be obtained in extremely fine dispersion with rapidity such as is impossible in other ways.

If an enamel substance, artificial or natural resin, size, cellulose ester, coal or the like is taken and to these small quantities of a solvent (5–10% as dispersion accelerator) are added and this mixture dispersed in suitable organic solvents, by the machine novel enamels are obtained in which the lakes are not dissolved but dispersed.

Example 4.

10 parts of cellulose and 100 parts of water with or without the addition 1–3% gelatine, protein (albumen) or soap without, or still better with the addition of 1–5% free alkali, are beaten up in the machine at a temperature of 90° C. for 3–5 hours. In this time there is formed an opalescent liquid in which the presence of cellulose is not manifest. If the mixture is further beaten until the temperature has sunk to 20° C., after 10 minutes standing the cell structure of the cellulose can no longer be seen with a hundredfold enlargement through the microscope. The finely distributed cellulose thus obtained may be rendered flocculent by means of acid and (or) acid salts. By evaporating under vacuum a substance is finally obtained which can no longer be described as cellular in structure but rather resembles celluloid. This is homogeneous and may be formed under pressure into articles of various kinds even without the addition of adhesives if the moulds are heated at a temperature of 120–150° C. under 100 to 300 atmospheres pressures. Similar product can be obtained by the new machines from wood pulp or the like with a sufficient quantity of water, temperatures and colloidal accelerating and also protective means. Further, organosols of cellular materials such as cellulose may be obtained by means of benzol, acetone and the like, while small quantities of cellulose ester soluble in acetone have been found to be good accelerators of dispersion. In addition to treating the ordinary pulp used in paper-making which has been "opened out" in known manner, it is also possible to use untreated wood constituents, such for instance as sawdust, to convert them into a very fine dispersed condition and obtain a homogeneous product therefrom which has quite different properties and appearance to wood.

A special advantage of such dispersed cellulose is that it can be converted much easier and more completely into cellulose ester and products available for artificial silk and the like can advantageously be obtained.

5. Further while by ordinary wet grinding the technical disintegration can be carried up to the limit 0.001 m.m. (one thousandth), by my process it can be carried easily up to 0.0001 m.m. (one-hundred thousandth).

6. Substances made by this dispersion process show colloidal properties, but those made in accordance with the ordinary wet grinding methods do not.

The theoretical basis which in this process in many cases governs the almost molecular dispersion, consist according to my observations, in that in the treatment of solid substances in a sufficient current of non-conducting fluid dispersion medium by rapid strong beating or friction on the separate particles of the substance, a momentary pressure action of hundreds of kilograms may be obtained which is to be regarded as the main cause of the dispersion. It is to be assumed that in such colossal, momentarily acting pressure or friction action, strong frictional electricity is formed, which in addition to the frictional or beating acton may be regarded as the actual cause or as the catalyser of the fine dispersions. That the static electrical power here formed by beating mainly effects the dispersion also appears from the fact that no colloidal condition can be obtained by grinding even in beating mills with dispersion media in the presence of good electrolytes (without protective colloids); only when sufficient protective colloids are added to the dispersion media is the appearance again evident and then only with weak electrolytes. However the process has been described so that it can be performed without the aid of this theory.

It may be useful to summarize the conditions of success for rapid operation on a commercial scale since it is considered that the present application contains the first disclosure of such conditions leading to a commercially applicable general method for obtaining dispersoids mechanically. Broadly speaking it is necessary to use an extraordinary and hitherto unprecedented intensity of comminution and it is found that increasing this intensity shortens the time of operation in quite a disproportionate manner so that economically it is necessary to operate at very high speeds. When disintegrating mechanically in a non-electrolyte without the aid of the hereafter described artifice, it is necessary to employ a peripheral speed of about 6,000 metres per minute, e. g. in a disintegrator having beater arms. This is the first condition.

Secondly, it has been found that in all cases it is necessary to employ a non-electrolyte or at any rate a very weak electrolyte unless certain artifices are employed. In the same way the material to be dispersed must not form an electrolyte with the dispersion medium.

Thirdly, it is of the greatest importance to use a large amount of the liquid dispersion medium. In practice at least 90% of liquid or more is employed to 10% of solid and in any case there must be at least 70% of liquid to obtain commercial results.

The above peripheral velocity is very high and the following further means can be employed to reduce it, but whether these means are employed or not the minimum velocity should be in the neighborhood of about 2,000 metres per minute. The economic advantage of using a high speed increases sharply about this point if efficiency is expressed as a function of speed.

Fourthly then the velocity can be reduced to 2,000 metres per minute if very high pressures are employed in cases when grinding mills are used.

Fifthly, the necessary speed can be reduced by using dispersion accelerators which may be classified as follows:—

(a) Chemical agents which are known to be solvents of the material to be dispersed to a greater or less extent, e. g. acetone or sulphur.

(b) Chemical agents which form chemical compounds of a labile nature with the dispersion medium in question which have colloidal properties provided that free ions are not formed in the dispersion medium or only very slightly. With an excess of the dispersion medium these labile compounds are decomposed and reformed. Example, addition of alkali in the dispersion of protein, wood, etc.

(c) Chemical agents which have the power of assisting the formation of complex compounds between the material to be dispersed and the dispersion medium. One type of such compounds is given by tannin which assists graphite particles to become hydrated by water molecules. Another type is illustrated in the addition of small quantities of sulphuric acid or phosphoric acid in the manufacture of colloidal phosphates.

At this point I may refer to my prior patents of 1913, e. g. No. 17729/13 which describes the mechanical disintegration of carbonaceous materials and contrasts this process with the work of Acheson or using tannin as a deflocculating agent. My British patents mention that the material is ground, for instance with oil or water "at high speed or heavy pressure." It will be seen from the above description that this patent does not disclose the necessity of employing speeds of about 2,000 metres per minute to obtain rapid results, nor does it set forth general principles which would enable a specific process for treating carbon or carbonaceous substances to be generalized into a process for dispersing an extremely wide range of other substances. It is well known that analogy gives practically no help in cases of colloid chemistry and it was not possible to foresee general conditions in which other substances could be mechanically converted into the colloidal state.

The apparatus which has been described is of particular value for commercially performing the invention. In the disintegrator type of colloid mill, important features are the eccentric mounting of the beaters so that an automatic circulation is obtained and the concentration of the action on a limited number of points or on one point by using a limited number of beaters. If the usual number of beaters is employed, it would be impossible to drive a mill on a commercial scale owing to the enormous liquid resistance. In the frictional type of colloid mill, important features are the external adjustability of pressure, the axial introduction of material and the cooling of the friction surfaces.

I declare that what I claim is:—

1. A mill for producing colloidal solutions comprising a liquid-tight casing, a disintegrator of the beater type eccentrically mounted therein and adapted to rotate at a peripheral speed of at least 1500 metres per minute.

2. A mill for producing colloidal solutions comprising a horizontal liquid-tight casing of cylindrical form, a shaft arranged eccentrically and horizontally in said casing adapted to rotate at high speed, beater bars carried by said shaft, and members cooperating with the beater bars.

3. A mill for producing colloidal solutions comprising a liquid-tight casing, a disintegrator of the beater type mounted eccentrically therein adapted to rotate at high speed and non-rotating abutments at the periphery of the casing adapted to co-operate with said disintegrator.

4. A mill for producing colloidal solutions comprising a liquid-tight casing, a disintegrator of the beater type mounted eccentrically therein, and a member at the centre of the casing adapted to co-operate therewith, said disintegrator being adapted to rotate at high speed.

5. A mill for producing colloidal solutions comprising a liquid-tight casing, a disintegrator of the beater type eccentrically mounted therein, and non-rotating beater bars arranged over a very limited portion of the periphery of the casing said disintegrator being adapted to rotate at high speed.

6. A mill for producing colloidal solutions comprising a liquid-tight casing, a disintegrator of the beater type eccentrically mounted therein adapted to rotate at high speed, and non-rotating beater bars mounted on a concave portion of a central member which member is adapted to form a closed circular path for the liquid.

7. A mill for producing colloidal solutions comprising a liquid-tight casing, a disintegrator of the beater type mounted therein, adapted to rotate at high speed and two sets of beater bars co-operating with the disintegrator to form disintegrating zones of limited extent but intensive action.

8. A mill for producing colloidal solutions comprising a liquid-tight casing, a disintegrator of the beater type, adapted to rotate at high speed and members adapted to co-operate with said disintegrator so that the disintegration is performed in a limited number of intensive disintegrating zones disposed unsymmetrically in the casing.

9. A mill for producing colloidal solutions comprising a liquid-tight casing, a disintegrator having radial projections and adapted to rotate at high speed and means to cause the liquid to circulate repeatedly through an annular path of which only a small portion is an intensive disintegration zone.

10. A mill for producing colloidal solutions comprising a liquid-tight casing, a disintegrator mounted therein, adapted to rotate at high speed, and a filter adapted to prevent outflow of liquid from said casing.

In witness whereof, I have hereunto signed my name this 15th day of March, 1921, in the presence of two subscribing witnesses.

HERMANN PLAUSON.

Witnesses:
WILLY JARNAU,
ALFRED BURIKHINE.